United States Patent
Shin et al.

(10) Patent No.: US 10,117,056 B2
(45) Date of Patent: Oct. 30, 2018

(54) METHOD AND SYSTEM FOR PROVIDING LOCATION-BASED SERVICE

(71) Applicant: NAVER Business Platform Corp., Seongnam-si, Gyeonggi-do (KR)

(72) Inventors: Hee Su Shin, Seongnam-si (KR); Jaewook Yoo, Seongnam-si (KR); Ho Jin Lee, Seoul (KR); Jungmin Kang, Seongnam-si (KR); Tae Gyu Kang, Seongnam-si (KR); Se Chun Oh, Seongnam-si (KR); Daewoong Kim, Seongnam-si (KR)

(73) Assignee: Naver Business Platform Corp., Gyeonggi-do (KR)

( * ) Notice: Subject to any disclaimer, the term of this patent is extended or adjusted under 35 U.S.C. 154(b) by 0 days.

(21) Appl. No.: 15/856,623

(22) Filed: Dec. 28, 2017

(65) Prior Publication Data

US 2018/0124569 A1    May 3, 2018

Related U.S. Application Data

(63) Continuation of application No. PCT/KR2016/005380, filed on May 20, 2016.

(30) Foreign Application Priority Data

Jun. 29, 2015 (KR) .................. 10-2015-0092429

(51) Int. Cl.
*H04W 4/02* (2018.01)
*H04W 64/00* (2009.01)
(Continued)

(52) U.S. Cl.
CPC ............. *H04W 4/023* (2013.01); *H04L 43/08* (2013.01); *H04W 4/33* (2018.02); *H04W 64/003* (2013.01); *H04W 64/006* (2013.01)

(58) Field of Classification Search
CPC ..... H04W 4/021; H04W 4/023; H04W 4/025; H04W 64/003; H04W 4/33;
(Continued)

(56) References Cited

U.S. PATENT DOCUMENTS

2013/0235863 A1* 9/2013 Cho .................. G01S 5/0252
                                                        370/338
2013/0310081 A1* 11/2013 Chu .................. H04W 4/025
                                                        455/456.3
(Continued)

FOREIGN PATENT DOCUMENTS

KR    10-2006-0104175 A    10/2006
KR    10-2010-0041540 A     4/2010
(Continued)

OTHER PUBLICATIONS

International Search Report dated Aug. 8, 2016 issued in corresponding International Application No. PCT/KR2016/005380.

*Primary Examiner* — Khawar Iqbal
(74) *Attorney, Agent, or Firm* — Harness, Dickey & Pierce, P.L.C.

(57) ABSTRACT

Disclosed are methods and systems for providing a location-based service. A location-based service providing method for determining a current location of a user terminal by interworking with a server including receiving a request to provide a location-based service, in response to the request, requesting and receiving first information about a wireless access point associated with a first building where the user terminal is located from the server; collecting second information about the wireless access point located near the user terminal, and determining a current location of the user terminal based on the first information and the second information may be provided.

16 Claims, 8 Drawing Sheets

(51) Int. Cl.
*H04M 1/00* (2006.01)
*H04W 4/33* (2018.01)
*H04L 12/26* (2006.01)

(58) Field of Classification Search
CPC ..... H04W 64/006; H04W 4/02; H04W 4/043; H04W 64/00; H04W 4/22; H04W 84/12; H04L 43/08; H04L 12/26; H04L 61/2038; H04L 61/609; H04M 1/72577; H04M 1/72572
See application file for complete search history.

(56) References Cited

U.S. PATENT DOCUMENTS

| | | | |
|---|---|---|---|
| 2015/0063338 A1* | 3/2015 | Ahn | H04W 4/02 370/338 |
| 2015/0296473 A1* | 10/2015 | Chan | H04W 64/00 455/456.1 |
| 2016/0014570 A1* | 1/2016 | Wuoti | G06Q 30/0207 455/456.3 |
| 2016/0018507 A1* | 1/2016 | Chen | H04W 4/043 455/456.2 |
| 2016/0084658 A1* | 3/2016 | Chao | G01C 21/206 701/533 |
| 2016/0195605 A1* | 7/2016 | Ryan | G01S 5/16 398/118 |
| 2016/0234653 A1* | 8/2016 | Chu | H04W 4/043 |
| 2017/0086164 A1* | 3/2017 | Park | G01S 19/00 |
| 2017/0308727 A1* | 10/2017 | Lombardi | G06Q 10/08 |
| 2018/0007516 A1* | 1/2018 | Ge | H04W 64/003 |

FOREIGN PATENT DOCUMENTS

| | | |
|---|---|---|
| KR | 10-2010-0108399 A | 10/2010 |
| KR | 10-1188538 B1 | 10/2012 |
| KR | 10-2015-0026041 A | 3/2015 |
| WO | WO-2012-091313 A2 | 7/2012 |

* cited by examiner

METHOD AND SYSTEM FOR PROVIDING LOCATION-BASED SERVICE

CROSS-REFERENCE TO RELATED APPLICATIONS

This application is a continuation of, and claims the benefit of priority under 35 U.S.C. § 365(c) from PCT International Application No. PCT/KR2016/005380, which has an International filing date of May 20, 2016 and designates the United States of America, which claims priority under 35 U.S.C. § 119 to Korean Patent Application No. 10-2015-0092429, filed on Jun. 29, 2015 in the Korean Intellectual Property Office (KIPO), the entire disclosure of each of which is incorporated herein by reference.

BACKGROUND

Technical Field

Example embodiments relate to location-based service providing technologies.

Description of Related Art

With the recent spread of smart phones and developments of mobile communication networks, users may readily utilize a variety of information and services without restrictions on a time and a space.

Among various services provided to the users, a location-based service are being applied to various services such as a bus/subway arrival time notification service and a global positioning service, thereby providing the users with information suitable for various purposes.

Further, with the developments of traffic facilities and convenience facilities, facilities such as a subway station and a bus terminal are being built to be connected to, for example, a complex shopping center or a department store, which includes, for example, a cinema, shops, and/or a bookstore therein. Thus, a scale of a building is enlarged, and a user may not easily arrive at a desired destination without using an indoor map of the building. Accordingly, a service for providing an indoor location of a user inside a building is being desired. For example, a method of verifying an indoor location of a terminal using a global positioning system (GPS) satellite signal, an external antenna, and outdoor/indoor mapping information is disclosed in Korean Patent Publication NO. 10-2010-0041540.

SUMMARY

One or more example embodiments provide location-based service providing methods and/or systems that is capable of providing a current location of a user terminal in conjunction with a server based on whether the user terminal is located inside a building or outside of the building.

According to an example embodiment, a location-based service providing method for determining a current location of a user terminal in conjunction with a server includes receiving a request to provide a location-based service, requesting the server for first information about a wireless access point associated with a first building in which the user terminal is located in response to the request, receiving the first information from the server, collecting second information about a wireless access point located around the user terminal, and determining the current location of the user terminal based on the first information received from the server and the second information.

According to an example embodiment, a location-based service providing system for determining a current location of a user terminal in conjunction with a server includes a memory configured to store computer-readable instructions, and one or more processors configured to execute the computer-readable instructions such that the one or more processors are configured to receive a request to provide a location-based service, request the server for first information about a wireless access point associated with a first building in which the user terminal is located in response to the request, receive the first information, collect second information about a wireless access point located around the user terminal, and determine the current location of the user terminal based on the first information and the second information.

According to an example embodiment, there is provided a non-transitory computer-readable recording medium storing instructions, which when executed by a computer, configures the computer to provide a location-based service by performing a method including receiving a request to provide the location-based service, requesting a server for first information about a wireless access point associated with a first building in which a user terminal is located in response to the request, receiving the first information from the server, receiving, from the user terminal, second information about a wireless access point located around the user terminal, and determining a current location of the user terminal based on the first information received from the server and the second information.

According to an aspect of at least one example embodiment, a file distribution system for distributing an installation file for installing an application on a user terminal includes a memory configured to store computer-readable instructions, and one or more processors configured to execute the computer-readable instructions such that the one or more processors are configured to store and manage the installation file, transmit the installation file to the user terminal in response to a request of the user terminal, and causing the application to be installed on the user terminal by using the installation file, the application configured to request a server for first information about a wireless access point associated with a building in which the user terminal is located in response to receiving a request to provide a location-based service, receive the first information, collect second information about a wireless access point located around the user terminal, and determine a current location of the user terminal based on the first information received from the server and the second information.

According to an example embodiment, a location-based service providing system for determining a current location of a user terminal includes a memory configured to store computer-readable instructions, and one or more processors configured to execute the computer-readable instructions such that the one or more processors are configured to receive a request to provide a location-based service requested from the user terminal in conjunction with a client server, the client server being executed service app configured on the user terminal, determine a first building in which the user terminal is located in response to the request, provide first information about a wireless access point associated with the first building to the user terminal through the client server, and determine the current location of the user terminal based on the first information and second information about the wireless access point provided around the user terminal collected by the user terminal.

According to some example embodiments, a current location of a user terminal may be determined in conjunction with a server based on whether the user terminal is located inside a building or outside of the building, thereby enabling more smooth determination of the current location of the user terminal even when the user terminal moves outside of the building or to another building.

DETAILED DESCRIPTION

Hereinafter, some example embodiments are described with reference to the accompanying drawings.

The example embodiments relate to a location-based service, and more particularly, to a method and system that may determine a current location of a user terminal moving inside a building and may provide a location-based service based on the determined location.

A location-based service used in our daily lives provides a location of a user terminal based on an indoor map and may measure and provide a location of the user terminal in a connection passage between buildings, an outdoor square, a rooftop, and facilities, for example, an outdoor garden, an outdoor kiosk, an open-air café, etc., in the vicinity of the building. For example, the example embodiments relate to a location-based service providing method and system that may measure and provide a current location of a user outside a building or a current location of the user having moved to another building in conjunction with a server in response to the user terminal moving outside of the building or moving to the other building through the outside of the building.

Herein, the term "information about a wireless access point (wireless access point information)" around the user terminal scanned or collected by the user terminal may include a media access control (MAC) address and a signal strength of the wireless access point. For example, the signal strength of the wireless access point may indicate a received signal strength indicator (RSSI) value received from the wireless access point located around the user terminal. Wireless access point Information generated in advance in a database may include a signal strength, for example, an RSSI value, of a wireless access point measured at a fingerprint point (FP) designated when constructing an indoor map of the building and a MAC address of the corresponding wireless access point.

Here, the term "cell information" refers to information provided periodically or in real time from a base station and may include at least one of identification information of a country in which the user terminal is located, identifier information of a telecommunication company joined by the user terminal, location area code (LAC) information of the corresponding country, identifier information of a base station to which the user terminal belongs, and identifier information of a cell of which the base station is in charge.

Hereinafter, although a wireless fidelity access point (WiFi AP) is used as a representative example of a wireless access point, it is provided as an example only. Any wireless access point that provides a near field wireless communication service may be employed in addition to the WiFi access point.

Figure 1:
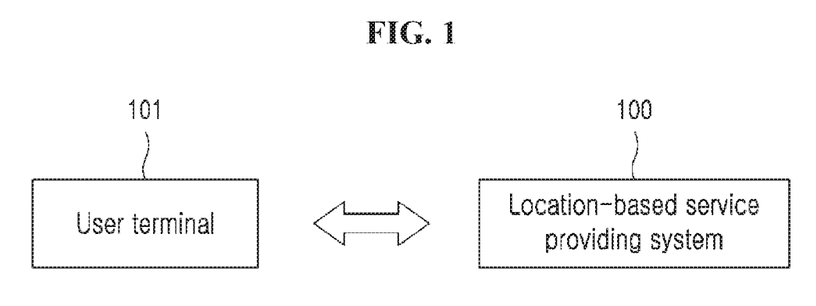
FIG. 1 is a diagram illustrating a relationship between a user terminal and a location-based service providing system according to an example embodiment.

FIG. 1 is a diagram illustrating a relationship between a user terminal and a location-based service providing system according to an example embodiment. FIG. 1 illustrates a location-based service providing system 100 and a user terminal 101. In FIG. 1, an indicator with arrowheads may indicate that data may be transmitted and received between the location-based service providing system 100 and the user terminal 101 over a wired/wireless network.

The user terminal 101 may indicate any type of terminal devices (e.g., a personal computer (PC), a smartphone, a tablet, or a laptop computer) that are capable of connecting to a website/mobile site associated with (e.g., in or around) the location-based service providing system 100 or are able to install and execute a service dedicated application (hereinafter, a service app). Here, the user terminal 101 may perform various service operations (e.g., a service screen configuration, a data input, a data transmission and reception, and/or a data storage) through connection to the website/mobile site or under control of the service app.

The location-based service providing system 100 may serve as a service platform that measures a location of the user terminal located in a building and provides a location-based service based on the measured location with respect to the user terminal 101 that is a client. For example, the location-based service providing system 100 may provide a user interface for receiving a user interaction to provide an indoor location measurement and a location-based service to the user terminal 101.

The location-based service providing system 100 may be configured in a form of an application on the user terminal 101, and may be configured to be included in a service platform that provides a my-location service, a tracking service, a direction service, a road guide service, a map search service, and the like, based on a current location of the user terminal in a client-server environment. As described above, the location-based service providing system 100 may be configured in the form of the application on the user terminal 101 or included in the service platform in a server (not shown) and may provide the location-based service. Also, the location-based service providing system 100 may be configured in all of the user terminal 101 and the server (not shown), and may provide the location-based service through interaction based on whether the user terminal 101 is located inside a building or outside of the building.

Figure 2:
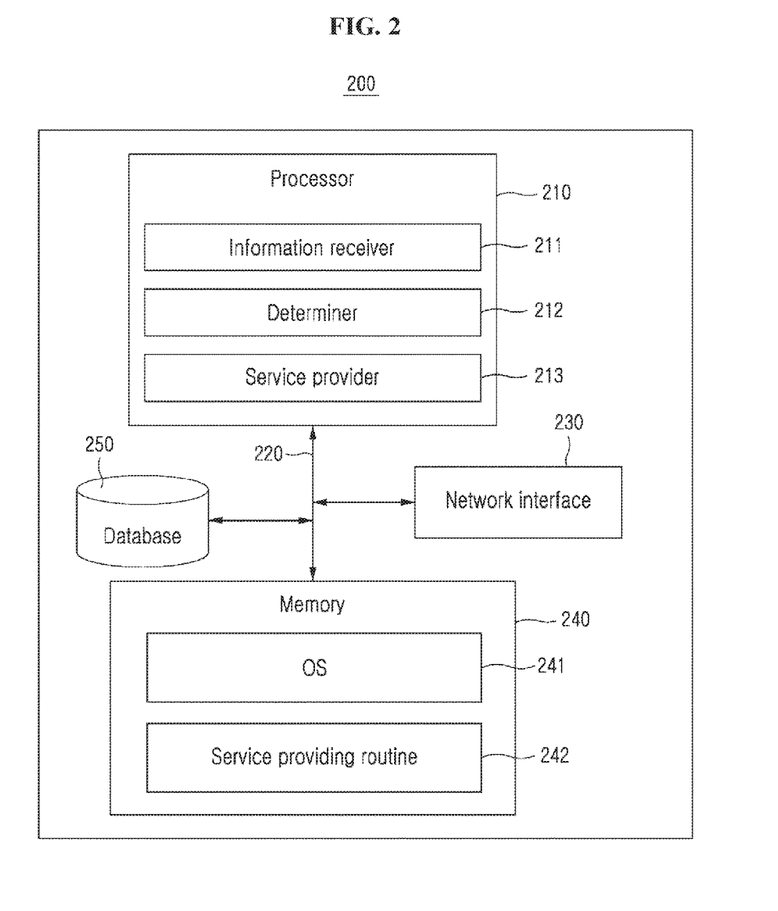
FIG. 2 is a block diagram illustrating a configuration of a location-based service providing system according to an example embodiment.
Figure 3:
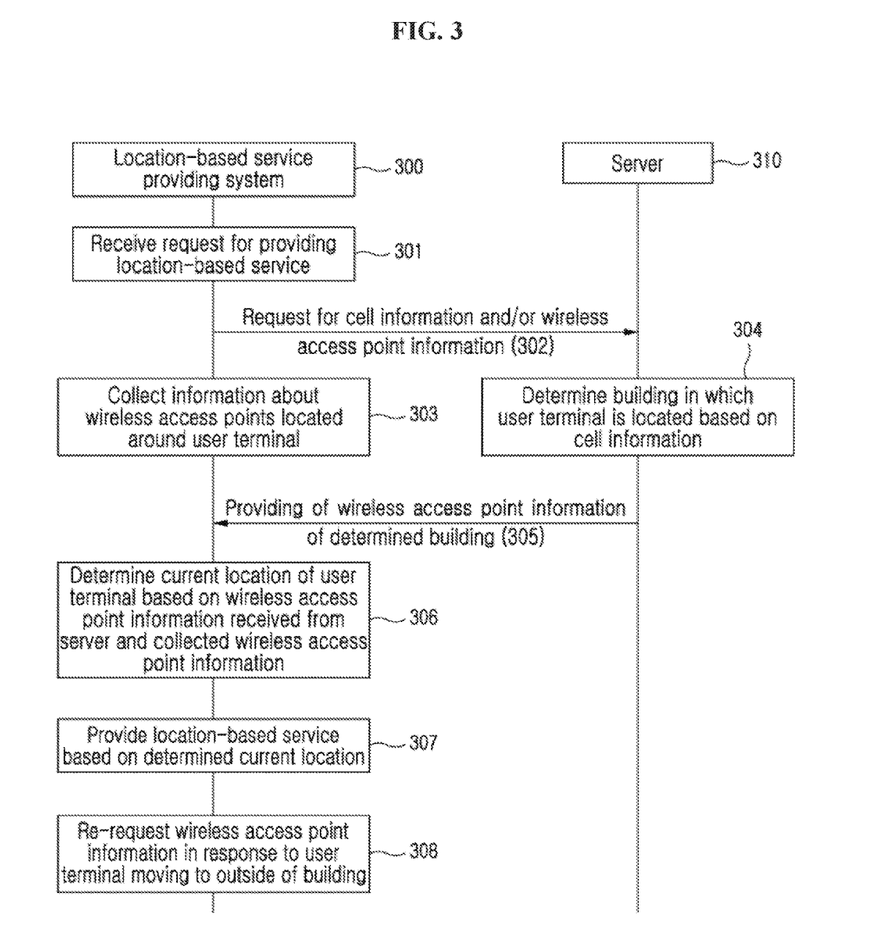
FIG. 3 is a flowchart illustrating a location-based service providing method according to an example embodiment.

FIG. 2 is a block diagram illustrating a configuration of a location-based service providing system according to an example embodiment, and FIG. 3 is a flowchart illustrating a location-based service providing method according to an example embodiment.

Referring to FIG. 2, a location-based service providing system 200 may include a processor 210, a bus 220, a network interface 230, a memory 240, and a database 250. The memory 240 may include an operating system (OS) 241 and a service providing routine 242. The processor 210 may include an information receiver 211, a determiner 212, and a service provider 213. According to some other example embodiments, the location-based service providing system 200 may include more components than the components shown in FIG. 2. However, detailed descriptions of the structure and operations of such components will be omitted. For example, the location-based service providing system 200 may include other components, such as a display or a transceiver.

The memory 240 may include a permanent mass storage device (e.g., random access memory (RAM), read only memory (ROM), and/or a disk drive) as a computer-readable recording medium. A program code for the service providing routine 242 and the OS 241 may be stored on the memory 240. In some example embodiments, such software components may be loaded from another computer-readable recording medium separate from the memory 240 using a drive mechanism (not shown). The other computer-readable recording medium may include, for example, a floppy drive, a disk, a tape, a DVD/CD-ROM drive, or a memory card. According to other example embodiments, software components may be loaded to the memory 240 through the network interface 230 instead of using the computer-readable recording medium.

The bus 220 may enable communication and data transmission between components of the location-based service providing system 200. The bus 220 may be configured using a high-speed serial bus, a parallel bus, a storage area network (SAN) and/or other appropriate communication techniques.

The network interface 230 may be a computer hardware component for connecting the location-based service providing system 200 to a computer network. The network interface 230 may connect the location-based service providing system 200 to the computer network through a wireless or wired connection.

The database 250 may serve to store and maintain information desired to provide a service of determining a current location of a user terminal and to provide a location-based service based on the determined current location of the user terminal. For example, the database 240 may be constructed in advance based on wireless access point information collected for each point inside a building when constructing an indoor map of the building. Here, each point may represent a fingerprint point (FP) virtually provided at a desired interval inside the building.

For example, when constructing the indoor map of the building, an indoor map construction apparatus (not shown) may collect information for constructing the indoor map while moving inside the building. Here, at each fingerprint point inside the building, the indoor map constructing apparatus (not shown) may collect information about a wireless access point around a corresponding fingerprint point. The collected wireless access point information may be matched to identification (ID) information of the corresponding building and stored in the database 250, and may be maintained and managed in the database 250. For example, wireless access point information collected at a fingerprint point (FP) in a building A may include at least one of identifier information of the FP, coordinates information (e.g., longitudinal and latitudinal global positioning system (GPS) coordinate values), of the FP, a media access control (MAC) address of a wireless access point located around the FP, and/or signal strength of the wireless access point located around the FP. The collected information may be matched to identifier information of the building A, and may be stored in advance in the database 250.

The database 250 may match identifier information of each near field wireless communication device (e.g., a beacon transmitter) provided in a building and identifier information of the building, and may store and maintain the matched information. The database 250 may be included in the location-based service providing system 200. If necessary, the database 250 may be included in the user terminal 101 or may be included in both of the location-based service providing system 200 and the user terminal 101. In some example embodiments, the database 250 may be present as an external database constructed on another system different from the location-based service providing system 200.

The processor 210 may be configured to process instructions of a computer program by performing basic arithmetic operations, logic operations, and input/output (I/O) operations of the location-based service providing system 200. The instructions may be provided from the memory 240 or the network interface 230 to the processor 210 through the bus 220. The processor 210 may be configured to execute a program code for the information receiver 211, the determiner 212, and the service provider 213. The program code may be stored in a recording device such as the memory 240.

Figure 4:
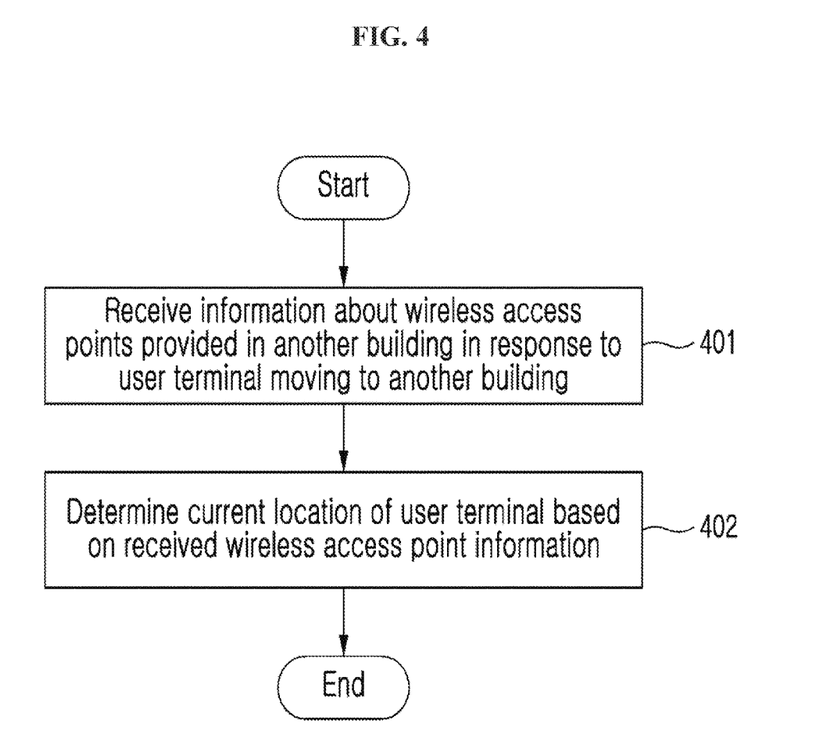
FIG. 4 is a flowchart illustrating an operation of determining a current location of a user terminal in response to the user terminal moving to another building according to an example embodiment.
Figure 5:
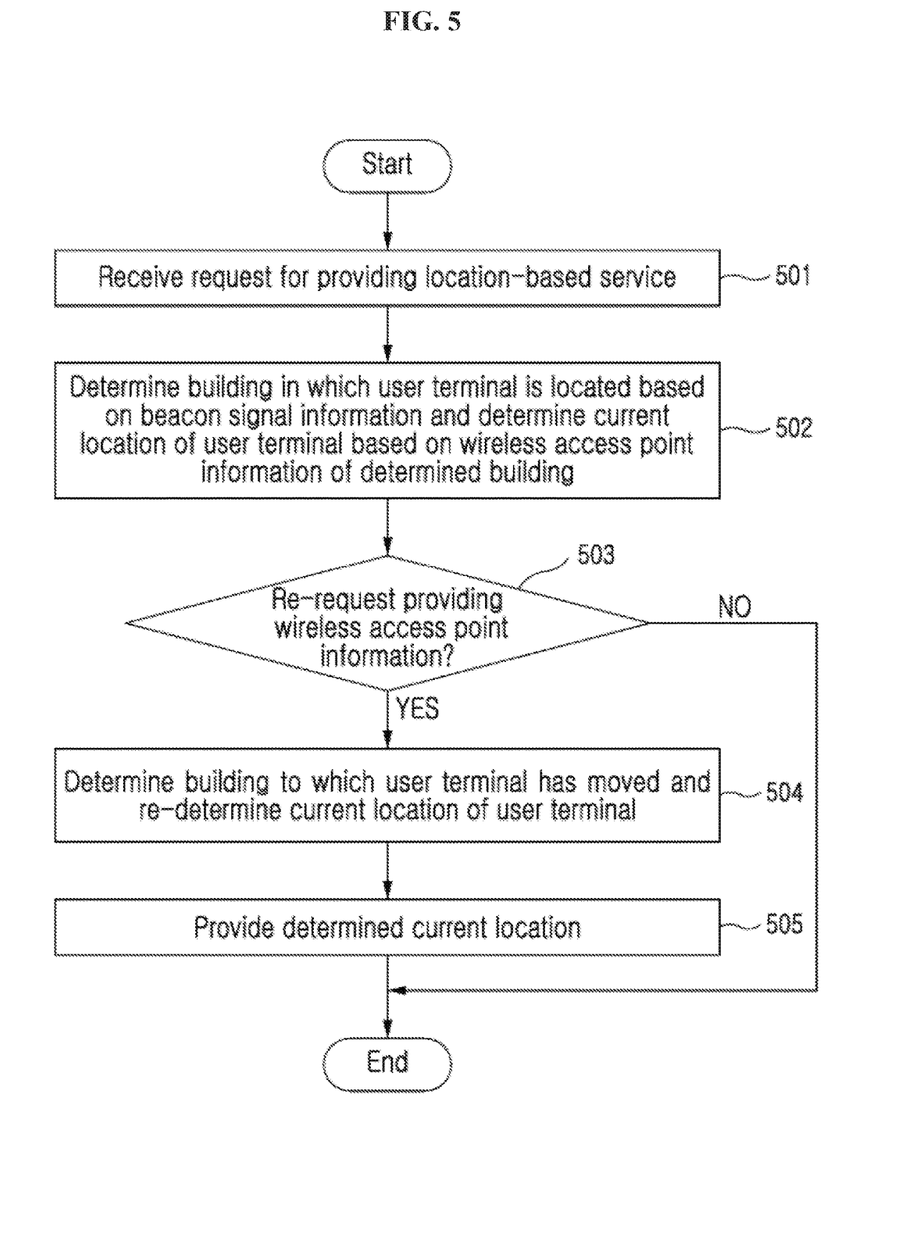
FIG. 5 is a flowchart illustrating an operation of determining a current location of a user terminal at a server according to an example embodiment.
Figure 6:
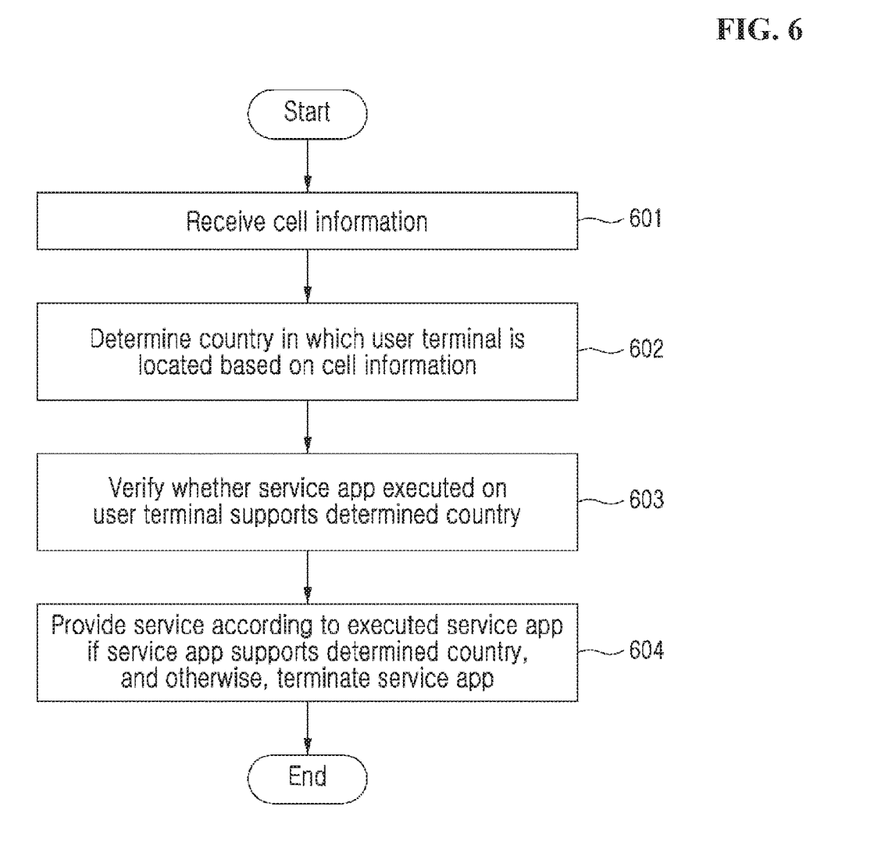
FIG. 6 is a flowchart illustrating an operation of providing a location-based service based on cell information according to an example embodiment.

The information receiver 211, the determiner 212, and the service provider 213 may be configured to perform operations 301 through 308 of FIG. 3, operations 401 and 402 of FIG. 4, operations 501 through 505 of FIG. 5, and/or operations 601 through 604 of FIG. 6. Hereinafter, a configuration in which a location-based service providing system configured in a form of an application on a user terminal determines and provides a current location of the user terminal in response to a request from the user terminal in a state in which a database has been constructed in advance when constructing an indoor map of a building will be described with reference to FIG. 3.

Referring to FIG. 3, in operation 301, the information receiver 211 may receive a request to provide a location-based service from the user terminal 101 through a user interface that provides a user interaction between the location-based service providing system 300 and the user terminal 101.

For example, the information receiver 211 may receive a request to provide a location-based service from the user terminal 101 in response to execution of a service app installed on the user terminal 101 or execution of an app associated with the location-based service.

In operation 302, in response to the request to provide the location-based service, the information receiver 211 may request a server 310 for information about a wireless access point provided in a building in which the user terminal 101 is located. Here, the information receiver 211 may transmit, to the server 310, signal information (e.g., beacon signal information received from a beacon transmitter) transmitted from a near field wireless communication device (not shown) provided in the building while requesting the server 310 for the wireless access point information. Hereinafter, the example embodiment is described by using the beacon transmitter as an example of the near field wireless communication device. However, example embodiments are not limited thereto, and other devices such as a Bluetooth communication device and/or a near field communication (NFC) device may be used for the near field wireless communication device.

For example, when the user terminal 101 enters a building A and initially executes a service app to use the location-based service, knowledge of the building A is absent. Thus, data for providing the location-based service (e.g., a my-location service, a road guide service, or a direction service) in the corresponding building may be desired. Accordingly, when the user terminal 101 initially enters the building A, the information receiver 211 may request the server 310 for data, for example, information about a wireless access point provided in the building A, to provide the location-based service. Once the data is provided from the server 310, the information receiver 211 may not request again the server 310 for the data.

As described above, when the user terminal 101 initially enters the building A, the user terminal 101 may receive, for example, beacon signal information from a beacon transmitter (not shown), which is provided, for example, at an entrance door or at a parking lot entrance of the building A, and the information receiver 211 may transmit, to the server 310, beacon signal information received from the user terminal 101. The beacon signal information may include identifier information of the beacon transmitter and identifier information of a building in which the beacon transmitter is provided.

In operation 303, in response to the request to provide the location-based service, the information receiver 211 may collect wireless access point information from each of wireless access points located around the user terminal.

For example, the information receiver 211 may collect wireless access point information from wireless access points provided around the user terminal 101 that is located in the building. Here, information about the wireless access points located around the user terminal may include a MAC address of each wireless access point, signal strength of each wireless access point collected by the user terminal 101, and the like. The signal strength of each wireless access point collected by the user terminal 101 may represent a Received Signal Strength Indicator (RSSI) value.

In operation 304, in response to receiving the request for information about the wireless access points provided in the building in which the user terminal 101 is located from a location-based service providing system 300, the server 310 may determine the building in which the user terminal 101 is located based on beacon signal information received from the location-based service providing system 300.

The server 310 may search the database 250 for identifier information of a building that is matched to identifier information of the building included in the beacon signal information, and may determine the building in which the user terminal 101 is located.

In operation 305, the server 101 may search the database 250 for information about the wireless access point corresponding to the matched identifier information of the building and may transmit the retrieved information to the location-based service providing system 300. For example, when the user terminal 101 is located in COEX Mall (which is located in South Korea and contains COnvention centers, EXhibition halls and many malls), the server 310 may search the database 250 for information about all of wireless access points provided in COEX Mall based on identifier information of a building that represents COEX Mall, and may transmit the retrieved information to the location-based service providing system 300.

The transmitted wireless access point information may include information about all of wireless access points provided in a plurality of buildings, which include the building in which the user terminal is located and are connected to each other indoors. For example, wireless access point information transmitted from the server 310 to the location-based service providing system 300 may include information about all of wireless access points provided in a department store, a shopping mall, a cinema, an underground shopping center, a hotel, a subway station, etc., connected to COEX Mall through underground passage.

In operation 306, the determiner 212 may determine a current location of the user terminal based on wireless access point information received from the server 310 and information about wireless access points located around the user terminal 101 collected by the user terminal 101.

For example, the determiner 212 may determine a current location of the user terminal based on a similarity between signal strength included in the wireless access point information about a wireless access point received from the server 310 and signal strength included in the wireless access point information about a wireless access point located around the user terminal 101 and collected by the user terminal 101. For example, the determiner 212 may determine location coordinates of a wireless access point having most similar signal strength as the current location of the user terminal 101. Further, the determiner 212 may determine a current location of the user terminal based on a location accuracy that is a standard indicating a level of accuracy between a current location of the user terminal determined through fingerprint-based indoor location measurement and an actual location of the user terminal. The location accuracy may be calculated based on at least one of a number of wireless access points and a similarity between signal strengths.

In operation 307, the service provider 213 may provide the location-based service based on the determined current location of the user terminal. For example, the service provider 213 may provide a my-location service, a direction service inside a building, a road guide service, and/or a tracking service. For example, in the case of providing the my-location service, an indoor map of the building and marking information indicating a current location of the user terminal 101 on the indoor map may be displayed on a screen of the user terminal 101. In the case of providing the direction service, a route from the determined current location to a destination input through the user terminal 101 may be displayed on the screen of the user terminal 101.

Here, the user terminal 101 may move from an inside of the building to an outside of the building. Due to moving from the inside to the outside of the building, it may be difficult to determine the current location of the user terminal 101 using only wireless access point information of the building A, for example, COEX Mall, received from the server 310.

In operation 308, in response to the user terminal 101 moving outside of the building, the information receiver 211 may re-request the server 310 for wireless access point information associated with the building in which the user terminal 101 is located to provide the location-based service.

FIG. 4 is a flowchart illustrating an operation of determining a current location of a user terminal in response to the user terminal moving to another building according to an example embodiment.

Referring to FIG. 4, in operation 401, in response to the user terminal moving from a building A to a building B, the information receiver 211 may request the server 310 for information about wireless access points provided in the moved building, that is, the building B.

For example, when the user terminal 101 moves out of the building A and moves to the building B, the user terminal 101 may receive beacon signal information from a beacon transmitter (not shown) provided in an entrance door, a parking lot entrance, etc., of the building B. The information receiver 211 may receive the beacon signal information from the user terminal 101 and the determiner 212 may verify that identifier information of a building included in the received beacon signal information differs from identifier information of a building included in previously received beacon signal information to determine a current location of the user terminal. Because the identifier information of the building is verified to be different, the determiner 212 may determine that the user terminal 101 has moved outside of the building A. The information receiver 211 may re-request the server 310 for wireless access point information associated with a building toward or into which the user terminal 101 is moving.

Here, the information receiver 211 may transmit beacon signal information of the building B to the server 310 while re-requesting the server 310 for the wireless access point information. The server 310 may search the database 250 for information that is matched to identifier information of the building included in the beacon signal information and may determine that the user terminal 101 is located in the building B. The server 310 may provide information about wireless access points provided in the building B to the location-based service providing system 300.

In operation 402, the determiner 212 may determine the current location of the user terminal 101 based on (1) wireless access point information, which is information about wireless access points provided in the building B, and received from the server 310, and (2) adjacent wireless access point information, which is information about wireless access points provided around the user terminal 101, and is collected by the user terminal 101. Here, an operation of determining a current location of the user terminal moving inside the building B is the same as or substantially identical to the operation of determining a current location of the user terminal according to moving inside the building A, which is described above with reference to FIG. 3. Accordingly, a repeated description is omitted. The service provider 213 may provide a location-based service associated with the building B to the user terminal 101 based on the determined current location of the user terminal 101.

As described above with FIGS. 3 and 4, to verify a building in which the user terminal 101 is located, once a service app is executed, the location-based service providing system 300 may initially determine the building in conjunction with the server 310 and may receive information about wireless access points provided in the determined building. Because the wireless access point information of the building is provided from the server, the location-based service providing system 300 may suspend the information request to the server until the user terminal 101 moves outside of the building or to another building through the outside of the building, and may determine a location of the user terminal according to a user movement without accessing the server 310. In other words, the location-based service providing system 300 may suspend the information request to the server if the current location of the user terminal 101 is determined to be inside the building and if the information about the wireless access points provided in the building has been received. That is, although communication between the user terminal 101 with the server 310 is not smooth and/or experiences packet loss, the location-based service providing system 300 may provide the location-based service based on the wireless access point information of the building A that was initially received from the server 310. For example, the user terminal 101 may use the location-based service inside the building A without incurring an additional packet use fee or a number of uses with regard to the server 310. In response to the user terminal 101 moving to the building B, the location-based service providing system 300 may perform a communication connection with the server 310 again and may request the server 310 to provide wireless access point information of the building B, may receive data desired to provide a location-based service in the building B from the server 310, and may determine a current location of the user terminal 101.

FIG. 5 is a flowchart illustrating an operation of determining a current location of a user terminal at a server according to an example embodiment.

The location-based service providing system 300 may be configured in a form of an application on the user terminal 101, or may be configured to be included in a service platform in the server 310 as shown in FIG. 5. Accordingly, similar to the location-based service providing system 300, the server 310 may include components of the information receiver 211, the determiner 212, and the service provider 213. An operation of determining a current location of a user terminal in a case in which the location-based service providing system 300 is included in the service platform is described with reference to FIG. 5.

Referring to FIG. 5, in operation 501, in response to a service app being executed on the user terminal 101, the information receiver 211 included in the server 310 may receive a request to provide a location-based service from the user terminal 101. Here, the executed service app (not shown) may be configured on the user terminal 101 and may operate as a client server. The information receiver 211 may receive, from the client server (hereinafter, referred to as the service app), a request to provide the location-based service requested from the user terminal 101 in conjunction with the client server (e.g., the user terminal 101). Further, the information receiver 211 may receive beacon signal information with the request through the service app executed on the user terminal 101.

In operation 502, the determiner 212 may search the database 250 for identifier information of a matching building based on the beacon signal information, and may search for wireless access point information that is matched to the retrieved identifier information of the building.

For example, the determiner 212 may determine a current location of the user terminal 101 based on the wireless access point information retrieved from the database 250 and adjacent wireless access point information collected by the user terminal 101. The service provider 213 may display the determined current location on a screen of the user terminal 101, and may provide a location-based service based on the determined current location to the user terminal 101 through the service app.

As another example, the service provider 213 may provide the retrieved wireless access point information to the user terminal 101 through the service app. The user terminal 101 may determine a current location of the user terminal based on the received wireless access point information from the service provider 213 and the adjacent wireless access point information collected from wireless access points adjacent to the user terminal 101 and may display the determined current location on the screen.

In operation 503, in response to the user terminal 101 moving to another building, the information receiver 211 may a re-request the server 310 to provide wireless access point information through the service app of the user terminal 101.

For example, in response to the user terminal 101 moving from a building A to a building B and/or in response to a current location of the user terminal 101 not being able to be measured, the information receiver 211 may receive, from the user terminal 101, beacon signal information received from a beacon transmitter provided in the building B and the determiner 212 may determine that the user terminal 101 has moved outside of the building A based on the beacon signal information. In response to the user terminal 101 moving outside of the building A, the determiner 212 may re-request the server 310 for wireless access point information associated with the building B to or into which the user terminal 101 is moving for determining a current location of the user terminal 101.

In operation 504, the determiner 212 may determine that the user terminal 101 is located in the building B based on the beacon signal information, and further may determine the current location of the user terminal 101 by matching wireless access point information to the identifier information of the building B retrieved from the database 250. For example, the determiner 212 may determine the current location of the user terminal 101 based on the adjacent wireless access point information collected by the user terminal 101 and the wireless access point information matched to the identifier information of the building B retrieved from the database 250. For example, the server 310 may determine a current location of the user terminal 101 based on a similarity between signal strength included in the adjacent wireless access point information and signal strength included in the wireless access point information matched to the identifier information of the building B retrieved from the database 250.

In operation 505, the service provider 213 may provide the determined current location of the user terminal to the user terminal 101. For example, the service provider 213 may display the determined current location on the screen of the user terminal 101 through the service app of the user terminal 101. Thus, the service provider 213 may provide a location-based service based on the current location to the user terminal 101.

FIG. 6 is a flowchart illustrating an operation of providing a location-based service based on cell information according to an example embodiment.

Referring to FIG. 6, in response to execution of a service app on the user terminal 101, the information receiver 211 may receive cell information from the user terminal 101 in operation 601. Here, the cell information, that is information received from a base station in response to the user terminal 101 being powered ON and connected to the base station, may be received from the base station and updated periodically or in real time.

For example, in response to the user terminal 101 entering a building A and initially executing a service app to use the location-based service, in response to the user terminal 101 executing the service app onboard an airplane, or in response to the user terminal 101 moving to another country and executing the service app, the information receiver 211 may receive cell information from the user terminal 101.

In operation 602, the determiner 212 may determine a country in which the user terminal is located based on the cell information. For example, the determiner 212 may determine a country in which the user terminal 101 is located based on country identifier information included in the cell information.

In operation 603, the determiner 212 may determine whether a country supported by the service app corresponds to the determined country based on setting information associated with the service app executed on the user terminal 101. For example, the setting information may include country identifier information about one or more countries supported by the service app, language information, and the like.

In operation 604, if the determined country corresponds to the country supported by the service app, the service provider 213 may provide a service corresponding to the executed service app. If the determined country does not correspond to the country supported by the service app, the service provider 213 may suspend execution of the service app. If execution of the service app is suspended, the service provider 213 may display a messaging indicating "the service app will be stopped because this country is not supported by the service app" on the screen of the user terminal 101.

The service provider 213 may verify whether the country in which the user terminal 101 is located is a country supported by the service app based on the cell information, and may provide a service for the service app. Accordingly, an error (e.g., power-down or shut-down of the user terminal 101) due to execution of the service app may be prevented or mitigated in the country that the service app does not support even without restarting or rebooting (e.g., turning off and turning on) the user terminal 101.

The methods according to the example embodiments may be configured in form of program instructions executable through various computer systems, and may be recorded in a non-transitory computer-readable recording medium.

A program according to the example embodiments may be configured as a PC-based program or an application exclusive for a mobile terminal. The service app, that is, a location-based service application herein may be configured in a form of an independently operating program or may be configured in an in-app form of a specific application to be operable on a specific application.

Also, the methods according to the example embodiments may be performed in such a manner that the service app controls the user terminal. The application may be installed on the user terminal through a file provided from a file distribution system. For example, the file distribution system may include an installation file manager (not shown) configured to store and manage an installation file and a file transmitter (not shown) configured to transmit the file in response to a request from the user terminal.

Figure 7:
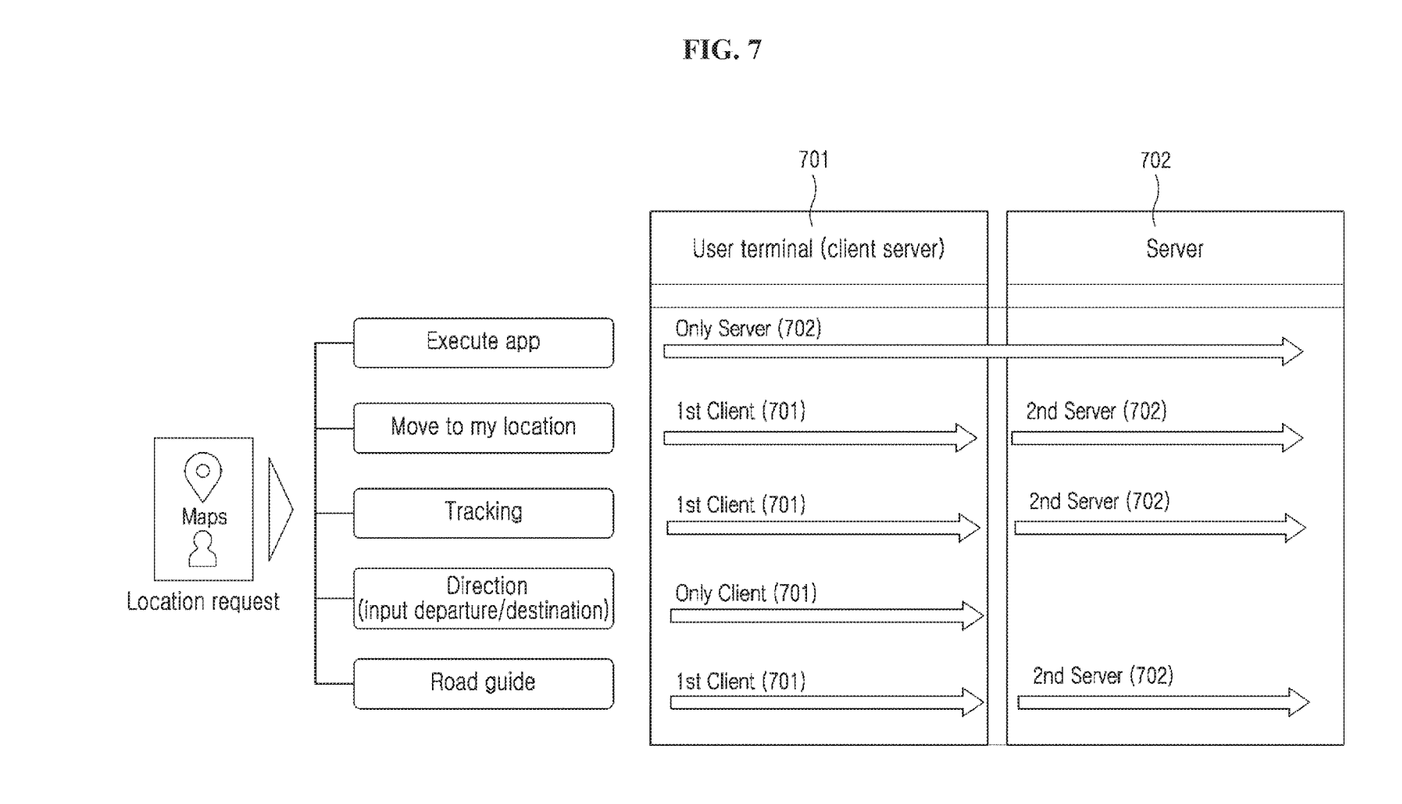
FIG. 7 is a diagram illustrating a dual server structure to provide a location-based service according to an example embodiment.

FIG. 7 is a diagram illustrating a dual server structure to provide a location-based service according to an example embodiment.

Referring to FIG. 7, a service app 701 for providing a location-based service may be configured on the user terminal 101 and may serve as a client server 701. The client server 701 and a server 702 in a service platform may constitute a dual structure and may provide the location-based service. The service app 701 that serves as the client server may provide the location-based service to the user terminal according to a preset location-based policy.

Referring to FIG. 7, a user may execute the service app 701 on the user terminal 101 and may request the location-based service. The client server 701 configured on the user terminal 101 and the server 702 may interact with each other based on the location-based service. A current location of the user terminal 101 may be provided from the server 702 at least once at a point in time at which the service app 701 was initially executed.

For example, if a my-location service is requested by executing the service app 701, a location of the user terminal is unknown at a point in time at which the service app 701 was executed. Accordingly, the user terminal 101 may establish a communication session with the server 702 for providing the location-based service and may receive a current location of the user terminal from the server 702 through the communication session. For example, information indicating the current location of the user terminal 101 may be displayed on a map displayed on the screen of the user terminal 101. Once the current location is provided from the server 702, a request to provide a current location of the user terminal to the server 702 may be suspended, a location of the user terminal 101 may be determined, and the my-location service may be provided using only the service app without intervention of the server 702. For example, the service app 701 may provide the my-location service according to the location accuracy-based policy. Here, if the service app 701 does not provide a current location of the user terminal due to the user terminal 101 being outside the building, or a malfunction of the service app, etc., the service app 701 may request the server 702 to provide a location of the user terminal 101 and may receive the location of the user terminal 101.

As another example, if a location tracking service is requested by executing the service app 701, a current location of the user terminal may be provided from the server 702 once at a point in time at which the service app 701 was initially executed. Similar to the my-location service, once the current location is provided from the server 702, a request to provide a current location of the user terminal to the server 702 may be suspended. The service app 701 may provide a tracking service for tracking a location of the user terminal using the service app itself without intervention of the user terminal 101 according to the location accuracy-based policy. Here, similar to the my-location service, if the service app 701 is incapable of temporarily providing the tracking service, the service app 701 may request the server 702 to provide a current location of the user terminal 101 and the user terminal 101 may receive the tracking service through the server 702 in response to the request.

As another example, similar to the my-location service and the tracking service, if a road guide service for guiding a route to a destination based on a current location is requested, a current location of the user terminal may be provided from the server once at a point in time at which the service app was initially executed. Once the current location is provided, a request to provide the location to the server 702 may be suspended. The service app 701 may provide the road guide service to the user terminal 101 according to a location accuracy-based policy without intervention of the server 702. If the service app 701 is incapable of providing a location of the user terminal, the service app 701 may request the server 702 to provide a location of the user terminal and may receive the location.

Here, in the case of using the road guide service, the my-location service, or the tracking service, once the location providing request to the server 702 is suspended, the service app 701 may o provide the road guide service, the my-location service, or the tracking service according to the policy. However, due to an occurrence of an error, a location of the user terminal may not be provided. For example, in a case that after the location providing request to the server 702 has been suspended, the service app 701 calls a function of detecting and providing a location of the user terminal according to the policy but fails to, receive results at a first try, the service app 701 may request the server 702 to provide a location of the user terminal. As described above, only when the service app 701 does not receive the first result, the service app 701 may request the server 702 to provide a location of the user terminal. In some example embodiments, the service app 701 may not provide a location of the user terminal while providing the road guide service, the my-location service, or the tracking service. In this case, the service app 701 may request the server 702 to provide a location of the user terminal and may continuously use the road guide service, the my-location service, or the tracking service.

Referring again to FIG. 7, if a direction service for receiving a departure and a destination and guiding a route to the destination is requested, the service app 701 may provide the direction service according to a location accuracy based policy without intervention of the server 702 until the direction service is terminated after the service app is executed.

Figure 8:
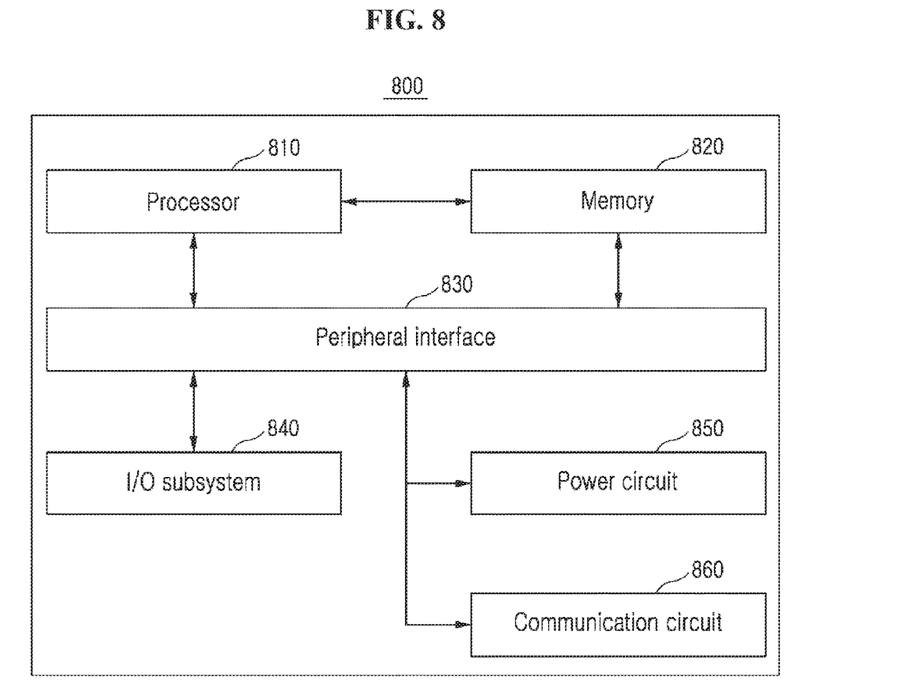
FIG. 8 is a block diagram illustrating an example of a configuration of a computer system according to an example embodiment.

FIG. 8 is a block diagram illustrating an example of a configuration of a computer system according to an example embodiment. Referring to FIG. 8, a computer system 800 may include at least one processor 810, a memory 820, a peripheral interface 830, an I/O subsystem 840, a power circuit 850, and a communication circuit 860. Here, the computer system 800 may correspond to a user terminal.

The memory 820 may include, for example, high-speed random access memory (HSRAM), a magnetic disk, static random access memory (SRAM), dynamic RAM (DRAM), ROM, a flash memory, or a non-volatile memory. The memory 820 may include a software module, an instruction set, or a variety of data, desired for an operation of the computer system 800. Here, an access from another component (e.g., the processor 810 and the peripheral interface 830) to the memory 820 may be controlled by the processor 810.

The peripheral interface 830 may couple an input device and/or an output device of the computer system 800 with the processor 810 and the memory 820. The processor 810 may perform a variety of functions for the computer system 800, and may process data by executing the software module or the instruction set stored on the memory 820.

The I/O subsystem 840 may couple various I/O peripheral devices with the peripheral interface 830. For example, the I/O subsystem 840 may include a controller for coupling one or more peripheral devices (e.g., a monitor, a keyboard, a mouse, a printer, a touch screen and/or a sensor) if desired, with the peripheral interface 830. According to another aspect, the I/O peripheral devices may be coupled with the peripheral interface 830 without using the I/O subsystem 840.

The power circuit 850 may supply power to all of or a portion of components of a terminal. For example, the power circuit 850 may include a power management system, at least one power source such as a battery and alternating circuit (AC), a charge system, a power failure detection circuit, a power converter or inverter, a power status indicator, or other components for creating, managing and distributing the power.

The communication circuit 860 may enable communication with another computer system using at least one external port. Alternatively, as described above, the communication circuit 860 may enable communication with another computer system by including a radio frequency (RF) circuit and thereby transmitting and receiving an RF signal known as an electromagnetic signal.

The example embodiment of FIG. 8 is only an example of the computer system 800. The computer system 800 may not include some of the components illustrated in FIG. 8, may include additional components not illustrated in FIG. 8, or may couple two or more components to each other. For example, a computer system for a communication terminal of a mobile environment may further include a touch screen, a sensor, and the like, in addition to the components of FIG. 8. A circuit for RF communication using a variety of communication methods, for example, wireless fidelity (WiFi), 3rd generation (3G), long term evolution (LTE), Bluetooth, near field communication (NFC), and/or ZigBee may be included in the communication circuit 860. Components includable in the computer system 800 may be configured as hardware that includes an integrated circuit specified for at least one signal processing or application, software, or a combination of hardware and software.

The aforementioned location-based service providing method may include less operations or additional operations based on the description made above with reference to FIGS. 1 through 8. Also, at least two operations may be combined and/or order or locations of operations may be changed.

The methods according to the example embodiments may be configured in a form of a program instruction executable through a variety of computer systems and may be recorded on a non-transitory computer-readable medium.

As described above, according to the example embodiments, every time a user terminal moves from a building A to a building B, a location-based service providing system may receive wireless access point information about wireless access points provided in a corresponding building in conjunction with a server only at a point in time at which the user terminal initially enters the corresponding building, and may determine a current location of the user terminal based on the received wireless access point information. That is, the location-based service providing system may receive the wireless access point information through communication with the server only once at a point in time of entry into the corresponding building and may determine a current location of the user terminal based on the received wireless access point information without further communication with the server. Accordingly, although a connection with the server is difficult due to a poor network connection state, the location-based service providing system may determine a current location of the user terminal moving inside the building and may provide a location-based service without using the server. Accordingly, network traffic according to communication connection with the server may be reduced.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tapes; optical media such as CD-ROM discs, and DVDs, magneto-optical media such as floptical disks, and hardware devices that are specially configured to store and perform program instructions, for example, read-only memory (ROM), random access memory (RAM) or flash memory. Some example may of program instructions include both machine code produced by, for example, a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:
1. A location-based service providing method for determining a current location of a user terminal in conjunction with a server, the method comprising:
receiving a request to provide a location-based service;

requesting the server for first information about a wireless access point associated with a first building in which the user terminal is located in response to the request;

receiving the first information from the server;

collecting second information about a wireless access point located around the user terminal;

determining the current location of the user terminal based on the first information received from the server and the second information, receiving cell information corresponding to a cell in which the user terminal is located from a base station;

providing a service corresponding to a service application in response to the service application executed on the user terminal being an application supporting a country in which the user terminal is located based on the cell information; and suspending execution of the service application in response to the application executed on the user terminal not being an application supporting the country in which the user terminal is located based on the cell information.

2. The method of claim 1, further comprising:

re-requesting the server for the second information in response to the user terminal moving outside of the first building.

3. The method of claim 2, wherein the re-requesting comprises:

requesting the server to measure the current location of the user terminal at least one of in response to the user terminal moving from inside of the first building to a second building or in response to the current location of the user terminal being unable to be measured; and receiving information about a wireless access point associated with the second building from the server in response to the server determining that the user terminal is located in the second building.

4. The method of claim 1, further comprising:

receiving signal information transmitted from a near field wireless communication device associated with the first building; and determining the first building in which the user terminal is located based on building identifier information included in the signal information.

5. The method of claim 1, wherein the first information includes information about wireless access points associated with a plurality of buildings, the plurality of buildings including the first building and being connected to each other.

6. The method of claim 1, further comprising:

providing the location-based service based on the determined current location.

7. The method of claim 1, wherein the requesting and the receiving the server for the first information comprises suspending the requesting in response to the current location of the user terminal being determined to be inside the first building and in response to receiving the first information.

8. A location-based service providing system for determining a current location of a user terminal in conjunction with a server, the location-based service providing system comprising:

a memory configured to store computer-readable instructions; and one or more processors configured to execute the computer-readable instructions such that the one or more processors are configured to, receive a request to provide a location-based service, request the server for first information about a wireless access point associated with a first building in which the user terminal is located in response to the request, receive the first information, collect second information about a wireless access point around the user terminal, determine the current location of the user terminal based on the first information and the second information, provide a service corresponding to a service application in response to the service application executed on the user terminal being an application supporting a country in which the user terminal is located based on a cell information, the cell information being information corresponding to a cell in which the user terminal is located, and suspend execution of the service application in response to the application executed on the user terminal not being an application supporting the country in which the user terminal is located based on the cell information.

9. The location-based service providing system of claim 8, wherein the one or more processors are further configured to re-request the server for the second information about a wireless access point around the user terminal in response to the user terminal moving outside of the first building.

10. The location-based service providing system of claim 9, wherein the one or more processors are further configured to, request the server to measure the current location of the user at least one of in response to the user terminal moving from an inside of the first building to a second building or in response to the current location of the user terminal being unable to be measured, and receive information about a wireless access point associated with the second building from the server in response to the server determining that the user terminal is in the second building.

11. The location-based service providing system of claim 8, wherein the one or more processors are further configured to, receive signal information transmitted from a near field wireless communication device associated with the first building, and determine the first building in which the user terminal is located on building identifier information included in the signal information.

12. The location-based service providing system of claim 8, wherein the one or more processors are further configured to provide the location-based service based on the determined current location.

13. A location-based service providing system for determining a current location of a user terminal, the location-based service providing system comprising:

a memory configured to store computer-readable instructions; and one or more processors configured to execute the computer-readable instructions such that the one or more processors are configured to, receive a request to provide a location-based service requested from the user terminal in conjunction with an executed service application configured on the user terminal, determine a first building in which the user terminal is located in response to the request, provide first information about a wireless access point associated with the first building to the user terminal through the executed service application, determine the current location of the user terminal based on the first information and second information about the wireless access point provided around the user terminal collected by the user terminal, receive cell information corresponding to a cell in which the user terminal is located, provide a service corresponding to a service application in response to the service application executed on the user terminal being an application supporting a country in which the user terminal is located based on the cell information, and suspend execution of the service application in response to the service application executed on the user terminal not being an application supporting the country in which the user terminal is located based on the cell information.

14. The location-based service providing system of claim 13, wherein the one or more processors are further configured to, receive signal information transmitted from a near field wireless communication device associated with the first building, and determine the first building in which the user terminal is located based on building identifier information included in the signal information.

15. The location-based service providing system of claim 13, wherein the one or more processors are further configured to, receive a re-request to provide the location-based service from the executed service application in response to the user terminal moving outside of the first building and the current location of the user terminal not being measured, and determine whether the user terminal has moved outside of the first building based on signal information of a near field wireless communication device received from the user terminal in response to the re-request.

16. The location-based service providing system of claim 13, wherein the one or more processors are further configured to determine the current location of the user terminal based on information about a wireless access point associated with a second building and the second information in response to the user terminal being determined to be in the second building.

* * * * *